United States Patent [19]

Miller et al.

[11] Patent Number: 4,540,435

[45] Date of Patent: Sep. 10, 1985

[54] SOLVENT EXTRACTION OF GOLD AND SILVER ANIONS UNDER ALKALINE CONDITIONS

[75] Inventors: Jan D. Miller; Michael B. Mooiman, both of Salt Lake City, Utah

[73] Assignee: University of Utah, Salt Lake City, Utah

[21] Appl. No.: 527,311

[22] Filed: Aug. 26, 1983

[51] Int. Cl.³ ............................................. B01D 11/04
[52] U.S. Cl. .................................. 75/118 R; 423/24; 210/634
[58] Field of Search ......... 423/24; 75/118 R, 101 BE; 210/634, 638

[56] References Cited

U.S. PATENT DOCUMENTS 3,734,722  5/1973  Ziegler .................................. 423/24
4,226,791 10/1980  Reinhardt et al. .................... 423/24
4,334,999  6/1982  Cornwell ............................ 423/112

FOREIGN PATENT DOCUMENTS 395463  1/1974  U.S.S.R. ............................... 423/24

Primary Examiner—John Doll
Assistant Examiner—Jeffrey E. Russel
Attorney, Agent, or Firm—Trask & Britt

[57] ABSTRACT

A technique for extracting gold values from an aqueous system containing gold cyanide anions by contact with a strong solvating extractant under basic conditions is disclosed. Useful extractants include organic phosphorus oxides and sulfur oxides.

9 Claims, 2 Drawing Figures

SOLVENT EXTRACTION OF GOLD AND SILVER ANIONS UNDER ALKALINE CONDITIONS

RELATED APPLICATION

This application is related to U.S. application Ser. No. 526,423 filed Aug. 25, 1983, entitled ION EXCHANGE EXTRACTION OF METALLIC AND NON-METALLIC ANIONS BY CONTROL OF THE BASICITY OF AMINE EXTRACTANTS, filed by the instant inventors, the contents of said application being incorporated herein by reference.

BACKGROUND OF THE INVENTION

1. Field

The present invention relates to the recovery of metal values from aqueous systems by extraction with an organic solvent or resin having minimal aqueous solubility.

2. Prior Art

Extraction of metal values from aqueous systems by means of ion exchange techniques such as solvent extraction has achieved prominence in hydrometallurgical processing technology.

Ion exchange and solvent extraction are widely used in hydrometallurgy and water purification. Solvent extraction, which is carried out by various organic liquid extractants, with or without diluents or modifiers, has been used in hydrometallurgy for the recovery of uranium, copper, and other metals. Synthetic resins which contain functional groups similar to those used in solvent extraction are also widely used for waste water purification and in hydrometallurgy for the separation of metallic ions. The use of resins with active functional groups is a form of extraction that involves a solid substrate. Such a substrate may be, but need not be, active in the ion extraction process. It may function merely as a carrier for an active extractant.

Recovery of metal values from aqueous systems by organic acids, amines, phosphorus oxide compounds and the like is frequently accomplished from acidic systems. Such extraction is conducted in systems having a pH of less than 7.

Solvent extraction of gold has not been practiced heretofore in industry. Laboratory experiments reported in the literature indicate that the extraction of gold from cyanide solutions is possible with weak base amines and neutral extractants such as long chain alcohols, ketones, and the like under acidic conditions.

Extraction of metal values from cyanide systems is generally not practiced industrially inasmuch as cyanide gas may evolve at low pH conditions in which solvent extraction procedures employing amines and the like have been practiced.

DESCRIPTION OF THE INVENTION

Figure 1:
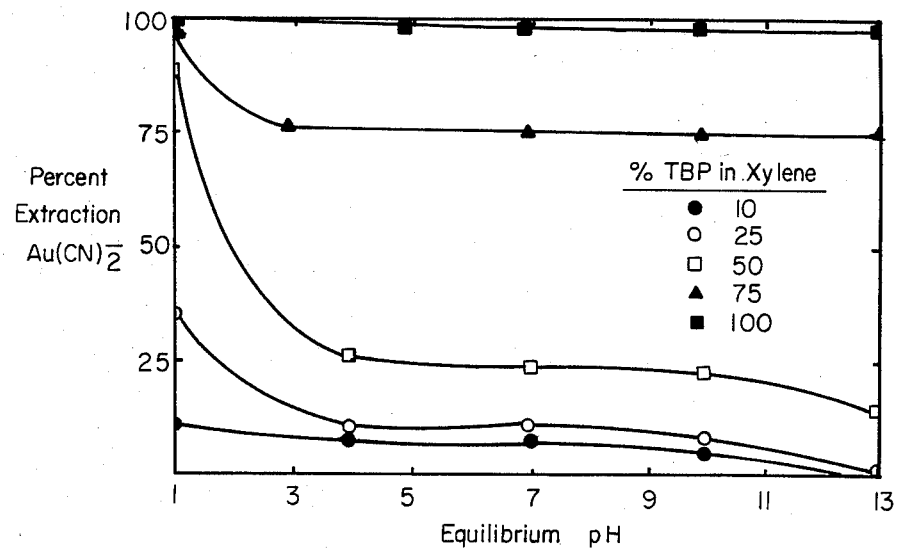
FIG. 1 is a graph depicting percent extraction of $Au(CN)_2^-$ (1.0 gram per liter in 0.5 M $Na_2SO_4$) versus pH for varying concentrations of tributyl phosphate in xylene.

A method for extracting gold and silver values from an aqueous system through employment of a solvating extractant under basic conditions has been invented. In particular, organic phosphorus and sulfur oxides can be utilized as effective extractants for recovering gold and silver from aqueous systems containing gold or silver cyanide anions. In certain instances, the addition of an indifferent electrolyte to the aqueous phase may be required to obtain appreciable extraction, i.e. recovery of metal values.

The activity and effectiveness of organic phosphorus oxides such as tributyl phosphate (TBP) and dibutyl butyl-phosphonate (DBBP) in recovering gold from alkaline cyanide solutions is very pronounced. Typically, extraction of gold by TBP heretofore has been associated with the presence of the uncharged aurocyanic acid, e.g. $HAu(CN)_2^0$. The instant invention, however, does not require generation of such a species.

In the instant invention, organic phosphorus oxides have shown significantly greater effectiveness than other solvating extractants such as methyl isobutyl ketone (MIBK) and dibutyl diethylene glycol (DBC) in extracting gold from cyanide solutions.

Cyanide anion complexes of gold and silver are effectively extracted from aqueous media by contacting such media with a strong solvating extractant such as an organic phosphorus oxide under alkaline conditions. Extraction by an undiluted extractant provides, generally, optimum recovery of metal values. However, extraction may be accomplished in the presence of a solvent capable of substantially dissolving said extractant and having minimal water solubility. Such solvent may be present as a result of recycling of a stripped extractant. Extraction by a strong solvating extractant such as DBBP may proceed in the absence of an electrolyte; however, the extraction effectiveness may be enhanced by the presence of an electrolyte depending upon the type of extractant used.

The extraction technique of this invention is generally practiced at ambient temperatures. As indicated hereinafter, stripping of metal values from the extractant may be accomplished by elevating the temperature of the extractant.

Extraction of gold and silver from alkaline cyanide solutions by a strong solvating extractant may be effectively conducted at various salt concentrations in an aqueous system. The need for salt addition, i.e. ionic strength adjustment, is dependent upon the strength, i.e. type, of extractant utilized. For example, TBP requires an ionic strength corresponding to about 0.5 M $Na_2SO_4$ in order to achieve complete recovery of gold from alkaline cyanide solutions. Salts useful as indifferent electrolytes include salts of alkali metals and alkaline earth metals. Strong extractants such as DBBP do not require the presence of an indifferent electrolyte to accomplish substantially complete metal recovery from dilute aqueous solutions.

Typical solvating extractants are organic sulfur oxides such as organic sulfoxides and sulfones, organic phosphorus oxides such as tributyl phosphate, dibutyl butyl phosphonate, butyl dibutyl phosphinate, tributyl phosphine oxide and trioctyl phosphine oxide or phosphorus groups attached directly to a substrate. These phosphorus oxides are listed in an ascending order of strength. The lower alkyl extractants are typically available in liquid forms. However, some oxides such as trioctyl phosphine oxide are solid and may require addition of a diluent. Solid systems such as liquid extractants partially absorbed in a resinous substrate or phosphorus oxide functional group chemically bonded to a polymeric resin are also useful.

Other alkyl moieties; for example, propyl, pentyl, hexyl, heptyl and the like may be substituted for the butyl and octyl groups in the above-listed compounds.

Many phosphorus oxides useful in the present invention have the following structure:

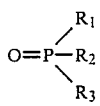

wherein $R_1$, $R_2$ and $R_3$ may be the same or different alkyl or alkoxy groups. The alkyl group and the alkyl portion of the alkoxy group are generally a hydrocarbon having less than about ten carbon atoms.

Organic sulfur oxides, such as sulfoxides and sulfones having similar organic moieties attached, may perform in a similar manner to the phosphorus oxides described herein.

Suitable electrolytes for inclusion in the aqueous medium are salts of alkali metals such as sodium and potassium, and of alkaline earth metals such as calcium, magnesium, and the like. The anion portion of such salts are typically chlorides, sulfates, nitrates and the like. Many such salts are naturally present in leach liquors containing gold or silver cyanide anions as well as other ionic constituents. Additional electrolyte may be included to bring the ionic strength of the system into a preferred range.

Although extraction by a strong solvating extractant according to the practice of this invention proceeds well in the absence of a solvent, a solvent may be included or may be present as a result of stripping of the metal values from the extractant. Such solvents include xylene, toluene, hexane, cyclohexane and the like.

EXAMPLE I

About 50 mls. of the aqueous and organic phases on a one-to-one basis were added to a beaker. The organic phase was prepared with a specific amount of extractant and diluent as required. The ionic strength and pH were adjusted to the desired levels. The organic and aqueous phases were mixed for a period of ten minutes, during which the pH was continuously monitored and adjusted to the required value. After ten minutes, the stirring was stopped and the phases allowed to disengage. A 2 ml. sample of the aqueous phase was then removed, filtered, and analyzed for the metal content by atomic absorption spectroscopy. A 2 ml. sample of the organic phase was also removed in order to maintain a constant phase ratio.

Accordingly, data of percentage extraction values as functions of independent variables such as pH, ionic strength, temperature, composition and such.

Several solvating extractants were evaluated, and the percent extraction versus pH behavior appears in Table 1.

TABLE 1

Percent Extraction of $Au(CN)_2$ ($1.0$ gl$^{-1}$) Versus pH for Selected Solvating Extractants. No Diluent Addition.

| pH | % Extraction by TBP* | % Extraction by MIBK* | % Extraction by DBC* | % Extraction by DBBP (No indifferent electrolyte) |
|---|---|---|---|---|
| 1 | 100.00 | 54.35 | 42.21 | 100.00 |
| 4 | 100.00 | 16.85 | 22.37 | 94.81 |
| 7 | 100.00 | 18.15 | 19.84 | 94.81 |
| 10 | 99.99 | 19.16 | 19.84 | 94.81 |
| 13 | 99.01 | 15.52 | 16.23 | 98.10 |

*Electrolyte present: 0.5 M. $Na_2SO_4$
TBP — Tributyl Phosphate
MIBK — Methyl Isobutyl Ketone
DBC — Dibutyl Diethylene Glycol
DBBP — Dibutyl butyl phosphonate Appreciable extraction by MIBK and DBC; i.e., good extraction at low pHs, is due to the formation of the neutral $HAu(CN)_2$. This is in accord with the results obtained by others previously for gold extraction by alcohols, ketones, etc. However, the excellent extraction by TBP over the whole pH range has not been reported, and these results were investigated in further detail.

The extent of gold extraction by TBP is presented in FIG. 1 as a function of pH for various concentrations of TBP. The first and most important trend to notice is that the percent extraction over the whole pH range increases as the fraction of TBP in the diluent increases. Complete, or almost complete, extraction of gold over the whole pH range is only obtained for 100% TBP. For the lower TBP concentrations, the percent extraction increases at pH values close to one. Again, this is probably due to the formation of aurocyanic acid, $HAu(CN)_2$.

The mechanism of extraction might be of the ion pairing type. In this regard, the effect of ionic strength on the extraction by 100% TBP was investigated. Ionic strength had a marked effect on TBP extraction of gold and a sodium sulfate concentration of 0.1 M resulted in 90% extraction. Higher levels of sodium sulfate allowed for even greater extraction as shown in FIG. 1. However, even for low ionic strength with only $NaAu(CN)_2$ in solution (no indifferent electrolyte), 30% extraction can be obtained. This is indicative of a relatively high ion association constant for the aurocyanide/cation ion pair in the presence of TBP. The effect of cation and anion type has also been investigated for other indifferent electrolytes and the results indicate no marked effect of either anion or cation type.

In contrast, it should be noted that nearly complete extraction can be achieved at all pH values with DBBP for low ionic strengths ($I \cong 0$) as shown in Table 1. These unexpected results of the effect of ionic strength on percent extraction for DBBP are compared to the results for TBP in FIG. 2. It is evident that gold extraction from alkaline cyanide solution by organic phosphorus oxide extractants may require ionic strength adjustment depending on the type (strength) of organic phosphorus oxide extractant selected. In this way, a suitable extractant can be selected based on the desired level of ionic strength.

Figure 2:
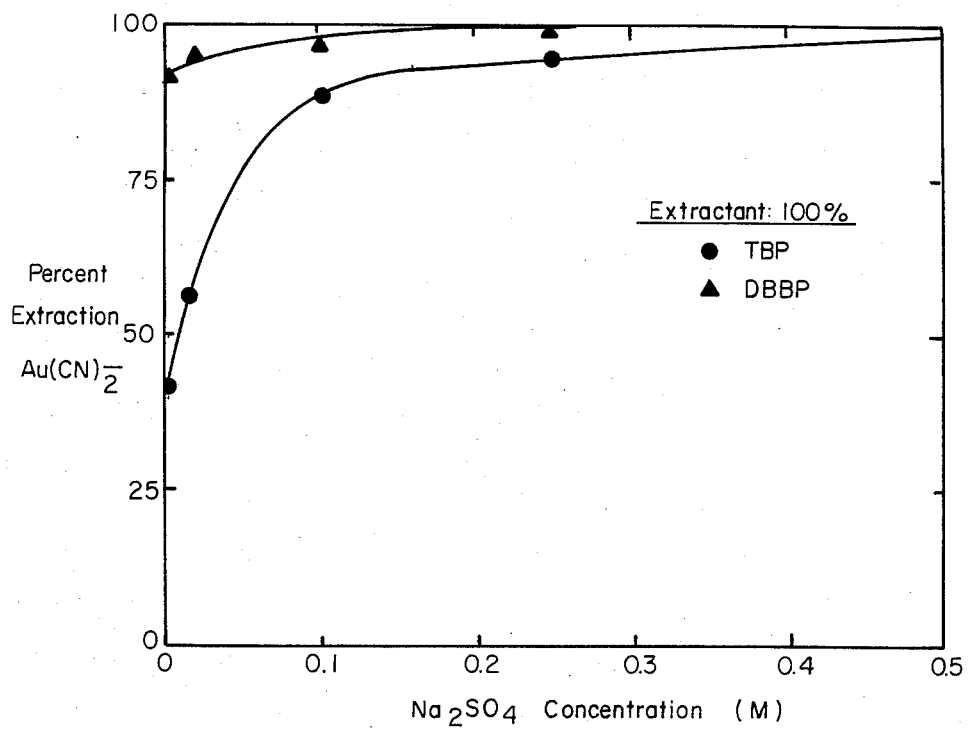
FIG. 2 is a graph plotting percent extraction versus $Na_2SO_4$ concentration for the extraction of gold from a 1000 ppm $Au(CN)_2^-$ solution by tributyl phosphate and dibutyl butyl phosphonate.

In FIG. 2 the effect of ionic strength upon extraction is depicted for TBP and DBBP. The extraction was conducted in a manner similar to that set forth in Example I. Indifferent electrolyte concentration, however, was varied by additions of $Na_2SO_4$. A substantially constant extraction efficiency was demonstrated by DBBP while the effectiveness of TBP as an extractant was significantly affected by ionic concentration.

Similar results are obtained for silver cyanide systems in a manner similar to the gold systems of Sample I.

Substantially similar results can be obtained in the above examples whenever butyl dibutyl phosphonate, tributyl phosphine oxide and trioctyl phosphine oxide are substituted for TBP or DBBP.

Stripping of metal values from the solvating extractant can be accomplished by temperature adjustment, ionic strength adjustment or dilution with an appropriate solvent.

Stripping by temperature increase of the extractant is particularly effective inasmuch as the chemical composition of the extractant is not altered and the stripped extractant may be readily recirculated to the extraction stage of the process. Stripping can be typically accomplished at a temperature significantly greater than the extractant temperature. The particular temperature for extraction or stripping may vary depending upon the particular extractant utilized as well as the metal concentration in the organic phase, the presence or absence of a solvent and ionic strength. The temperature, of course, can be raised to a point where stripping is accomplished by distillation of the organic phase.

EXAMPLE II 100 mls. of TBP were loaded with gold from an alkaline (pH=10) gold cyanide solution containing 0.5 M $Na_2SO_4$ of 1000 ppm using conventional contact tests as described earlier. The loaded organic phase was filtered and then contacted with 100 mls. of distilled water (I≅0) in a constant temperature bath for 30 minutes. A 2 ml. sample of the aqueous phase was removed and analyzed for its gold content by atomic absorption spectroscopy. The temperature was then raised to a new value and the contacting, sampling, and analytical procedure repeated. In this manner, the results in the following table were obtained.

TABLE 2

| Temperature °C. | % Gold Stripped from Organic |
|---|---|
| 25 | 78.00 |
| 36 | 78.20 |
| 50 | 89.91 |
| 65 | 87.69 |
| 78 | 94.55 |

There are two aspects to be noted from the results presented in Table 2. First, the contacting of the loaded organic phase with an aqueous solution of lower ionic strength than the original gold solution (distilled water versus a solution containing 0.5 M $Na_2SO_4$) allowed a substantial amount of the gold to be stripped from the organic phase (78%); and second, increasing the temperature at which the stripping is performed further increases the extent to which gold is recovered/stripped from the organic phase (98% at 78° C). Thus, both a decrease in ionic strength (relative to the original solution) and an increase in temperature enhances stripping and good recoveries of gold from the loaded organic phase can be achieved.

The type and concentration of extractant utilized as well as the ionic strength employed during extraction are determined with due regard to the desired level of loading and the selectivity of the extraction technique with respect to the type of contaminants present in the aqueous phase. Also, the type of stripping technique contemplated may play a role in the selection of the extractant and the determination of other extraction variables.

We claim:

1. A method for extracting gold or silver values from an aqueous system containing gold or silver cyanide anions comprising contacting said system with a strong solvating extractant having minimal water solubility at pH ranges of above about 7, wherein said extractant is an alkyl phosphorus oxide or an organic sulfur oxide.

2. The method of claim 1 wherein said contacting is conducted in the presence of an organic solvent capable of substantially dissolving said extractant.

3. The method of claim 1 wherein said organic phosphorus oxide is a lower alkyl phosphorus oxide.

4. The method of claim 3 wherein said phosphorus oxide is selected from the class consisting of tributyl phosphate, dibutyl butyl phosphonate, butyl dibutyl phosphinate, tributyl phosphine oxide, and trioctyl phosphine oxide.

5. The method of claim 1 wherein an electrolyte is present in said aqueous system.

6. The method of claim 1 wherein said extractant containing gold values is stripped of said gold or silver values by temperature adjustment of said extractant.

7. The method of claim 1 wherein said extractant containing gold or silver values is stripped of said gold or silver values by dilution of said extractant with a compatible solvent.

8. The method of claim 1 wherein said extractant containing gold values is stripped of said gold values by decreasing the ionic strength of the strip solution.

9. The method of claim 1 wherein said extractant is partially absorbed in a resinous substrate.

* * * * *